United States Patent [19]

Duckett et al.

[11] Patent Number: 4,639,257
[45] Date of Patent: Jan. 27, 1987

[54] RECOVERY OF CARBON DIOXIDE FROM GAS MIXTURE

[75] Inventors: Melvyn Duckett; David I. Limb, both of Stockport, United Kingdom

[73] Assignee: Costain Petrocarbon Limited, Wythenshawe, England

[21] Appl. No.: 755,374

[22] Filed: Jul. 15, 1985

Related U.S. Application Data

[63] Continuation-in-part of Ser. No. 675,292, Nov. 17, 1984, abandoned.

[30] Foreign Application Priority Data

Dec. 16, 1983 [GB] United Kingdom ............. 8508002
Mar. 27, 1985 [GB] United Kingdom ............. 8333628

[51] Int. Cl.$^4$ ............................................. B01D 53/22
[52] U.S. Cl. ............................................. 55/16; 55/68; 203/39; 203/41
[58] Field of Search ............... 55/16, 68, 158; 203/39, 203/41

[56] References Cited

U.S. PATENT DOCUMENTS

| | | | |
|---|---|---|---|
| 2,159,434 | 5/1939 | Frey | 203/39 X |
| 2,583,601 | 1/1952 | Schwertz | 55/16 |
| 2,970,106 | 1/1961 | Binning et al. | 55/16 X |
| 3,250,080 | 5/1966 | Garwin | 55/16 X |
| 4,119,417 | 10/1978 | Heki et al. | 55/158 |
| 4,130,403 | 12/1978 | Cooley et al. | 55/16 |
| 4,181,675 | 1/1980 | Makin et al. | 55/158 X |
| 4,374,657 | 2/1983 | Schendel et al. | 55/158 X |
| 4,386,944 | 6/1983 | Kimura | 55/158 X |
| 4,466,946 | 8/1984 | Goddin, Jr. et al. | 55/16 X |

FOREIGN PATENT DOCUMENTS

| | | |
|---|---|---|
| 1108512 | 4/1968 | United Kingdom . |
| 1471699 | 4/1977 | United Kingdom . |
| 1,590,813 | 6/1981 | United Kingdom . |

Primary Examiner—Robert Spitzer
Attorney, Agent, or Firm—Browdy and Neimark

[57] ABSTRACT

Carbon dioxide is recovered from gas mixtures containing it in a concentration not greater than the equilibrium concentration at the freezing temperature of the mixture, by subjecting the gas mixture to membrane separation and recovering from the membrane separation a permeate having a carbon dioxide concentration between the equilibrium concentration and 98% (by volume), distilling said permeate at subambient temperature above the freezing temperature of the permeate and recovering substantially pure carbon dioxide as a liquid bottoms product of the distillation. Carbon dioxide is recovered from gas mixtures containing it in a high concentration by supplying the gas mixture at superatmospheric pressure and distilling said gas mixture at sub-ambient temperature in a distillation column, recovering substantially pure carbon dioxide as a liquid bottoms product of the distillation, warming the overhead stream from the distillation to a temperature suitable for membrane separation, passing the overhead stream at superatmospheric pressure over a membrane which is selectively permeable for carbon dioxide and thereafter recycling carbon dioxide-rich permeate for recompression and feeding to the distillation column.

16 Claims, 4 Drawing Figures

Figure 1:
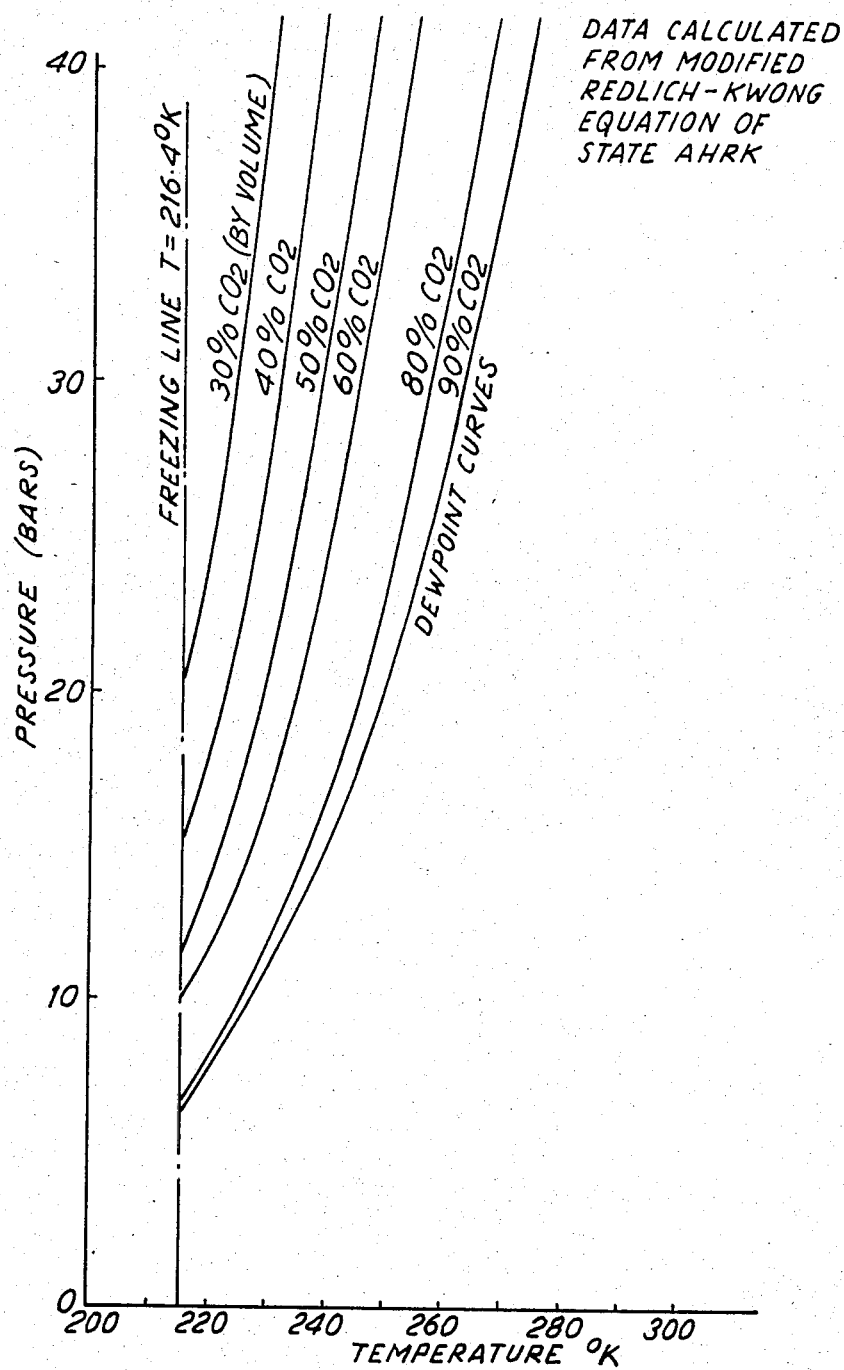

FIG.1 PRESSURE TEMPERATURE COMPOSITION DIAGRAM FOR NITROGEN/CARBON DIOXIDE MIXTURES

FIG. 2 TEMPERATURE COMPOSITION DIAGRAM FOR NITROGEN/CARBON DIOXIDE MIXTURES

RECOVERY OF CARBON DIOXIDE FROM GAS MIXTURE

This is a continuation-in-part of parent, copending application Ser. No. 675,292, filed Nov. 17, 1984, and now abandoned in favor of the present application.

This invention relates to the recovery of high purity carbon dioxide from gas mixtures. In a first embodiment the invention is particularly concerned with the treatment of gas mixtures in which the carbon dioxide is present in an amount below the equilibrium concentration at the freezing point of the mixture. In a second embodiment the invention is concerned with the treatment of gas mixtures in which the carbon dioxide is present in high concentrations.

Processes for the recovery, purification and liquefaction of carbon dioxide from carbon dioxide rich streams e.g. fermentation gas and off gases from chemical processes such as ethylene oxide production or ammonia production, are well known. These processes normally carry out the final purification (involving removal of light gases such as hydrogen, nitrogen, oxygen, methane and carbon monoxide) either by cooling and partial condensation of the gas, thus producing a liquid enriched in carbon dioxide and a tail gas lean in carbon dioxide, or by cooling and distillation if a purer carbon dioxide product e.g. greater than 99% pure, by volume, is required.

Such processes are limited by the fact that gas mixtures containing carbon dioxide have a relatively high freezing point. Pure carbon dioxide freezes at a temperature of 216.4° K. and while this temperature may change depending on the other components in the mixture and the pressure, it is still the factor which determines the degree of separation which can be achieved.

Figure 2:
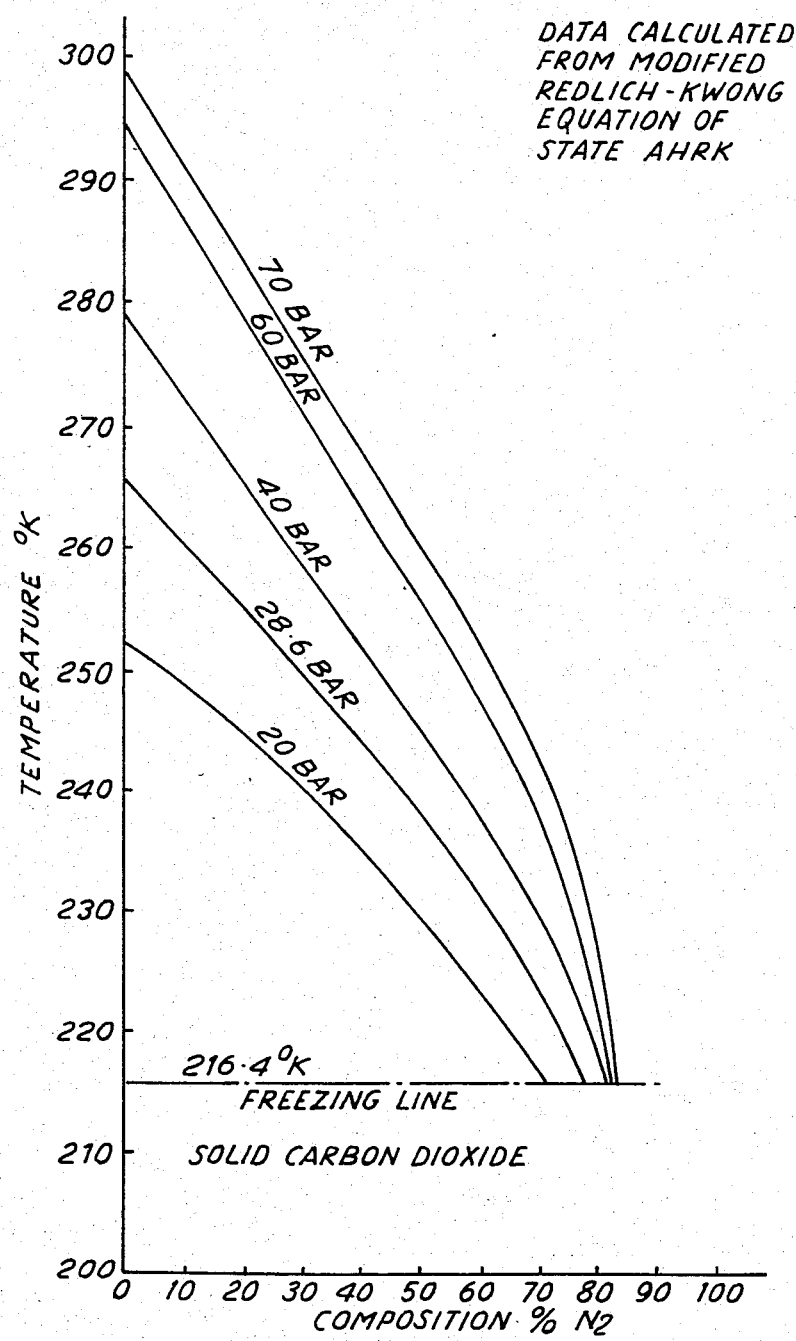

If a gas mixture contains less than the equilibrium concentration of carbon dioxide at the freezing temperature of the mixture concerned then the carbon dioxide cannot be separated by cooling and partial condensation or by cooling and distillation, since the carbon dioxide will freeze before any liquid is formed. This is illustrated in FIG. 1 which shows the dewpoint curves for nitrogen/carbon dioxide mixtures, and FIG. 2 which shows a typical temperature composition diagram for nitrogen/carbon dioxide mixtures at various pressures. At a pressure of 20 bar, for example, the equilibrium carbon dioxide content of the vapour at the freezing temperature of 216.5° K. is approximately 30% by volume. This means that at a pressure of 20 bar, gaseous mixtures of nitrogen/carbon dioxide which contain less than approximately 30% by volume carbon dioxide cannot be separated by cooling followed by partial condensation or distillation.

Many gases exist where the carbon dioxide content of the gas is low and purification directly by cooling and partial condensation cannot be achieved directly due to freezing problems, e.g. lime kiln gas, boiler flue gas and certain natural gases.

A solution to this problem, which is used commercially, is to scrub the gas mixture which is lean in carbon dioxide with a suitable solvent, e.g. monoethanolamine, sulfolane or potassium carbonate, whereby to dissolve the carbon dioxide and then to strip the carbon dioxide from the solution so obtained; i.e. another fluid is introduced into the system in order to achieve the necessary separation. The carbon dioxide can then be compressed, dried, cooled and further purified by partial condensation or distillation. However this process is expensive in energy and a less energy-intensive alternative would be desirable.

In a process developed for the recovery of high purity carbon dioxide from a gas mixture, the gas mixture is compressed, preferably to a pressure of approximately 15 to 25 bar, and dried by absorption or other conventional means (all pressures are given in bar absolute). After removal of undesirable impurities such as sulphur containing compounds, the mixture is cooled and separated by distillation, yielding high purity carbon dioxide as a bottoms product. However, the overhead product of the distillation column will always contain a significant proportion of carbon dioxide, generally at least 60 percent, which is normally wasted.

The high percentage of carbon dioxide in the overhead stream is due to the equilibrium conditions prevailing in mixtures with light hydrocarbons which, at the usual operating pressures of around 20 bar and condenser temperatures around $-30°$ C., lead to vapour concentrations around 60 to 70% $CO_2$. This situation is not substantially improved by operation at lower temperatures, which may lead to azeotrope formation and/or solidification of carbon dioxide. As a result, particularly when the feed gas contains a significant amount of non-condensibles or inerts, such as nitrogen, oxygen or methane, it is not possible to approach 100% recovery of carbon dioxide. For example with only 3 mol percent of non-condensibles or inerts present, the $CO_2$ recovery would be limited to about 95 percent.

A gas separation method that has recently found commercial success is the membrane separation process which involves passing the mixture to be separated at superatmospheric pressure over a semi-permeable membrane across which a pressure drop is maintained and through which one or more of the components of the gas mixture is selectively permeable. This technique has already been proposed for th removal of carbon dioxide as an undesirable impurity from a gas stream, and also for the separation of carbon dioxide from an oil well stream for recycle to the oil well to assist recovery of oil. In neither case, however, is the purity of the separated carbon dioxide stream a matter of importance, nor is high recovery achievable.

Although it would be possible theoretically to recover carbon dioxide in a high degree of purity, e.g. 99% or more pure, from a gas mixture by membrane separation, this would be uneconomical because of the high pressure and/or number of separation steps that would be required.

It has now been found unexpectedly that carbon dioxide can be recovered economically and at a high level of purity, e.g. 99% by volume or purer, from a gas mixture which contains the carbon dioxide in a concentration at or below the equilibrium concentration at the freezing point of the mixture, by combination of membrane separation and distillation under certain conditions.

It has also been found unexpectedly that the recovery of high purity $CO_2$ (e.g. 99% by volume or purer) from gas mixtures in which a high concentration of carbon dioxide is present can be raised to an economically desirable level, e.g. 99 percent or more by employing in a particular manner a combination of distillation and membrane separation using a suitable membrane.

According to one aspect of the present invention, there is provided a process for the recovery of carbon dioxide from a gas mixture containing it in a concentration not greater than the equilibrium concentration at the freezing temperature of the mixture, the process comprising concentrating the carbon dioxide in the mixture to a level between said equilibrium concentration and 98% (by volume) of the mixture by membrane separation and thereafter distilling the concentrate at sub-ambient temperature and recovering carbon dioxide as a liquid bottoms product of the distillation.

While the process can be operated satisfactorily with the carbon dioxide content of the gas (concentrate) recovered from the membrane separation as low as 40% or 50%, by volume, the best results from an economical point of view are obtained when the gas contains at least 85% and more preferably at least 90% carbon dioxide, by volume. Carbon dioxide can then be recovered at levels of purity similar to those achievable by the known process of solvent extraction and distillation but with an energy saving which can be as much as 20% or even more in some cases, especially if the overhead stream (i.e. tail gas) from the distillation step is recycled to the membrane separation step.

While the membrane separation may be operated in a single step, it is preferred to employ at least two steps with the carbon dioxide-enriched permeate of the first being subjected to a second separation, if necessary with intermediate recompression. While more than two steps may be employed, if desired, the further improvement so obtained is not so great. Where the membrane separation involves more than one separation step, any recycle of the overhead stream from the distillation column may be to the first or a subsequent step of the membrane separations, as desired. In some cases, such recycle may be desirable not only to optimise carbon dioxide recovery but also to recover one or more other components of the feed gas stream which are retained in said overhead stream from the distillation column.

The process is particularly applicable to the treatment of gases which contain carbon dioxide in a mixture with nitrogen and/or methane optionally together with other hydrocarbons, e.g. ethane, propane and/or butane.

According to another aspect of the present invention there is provided a process for the recovery of carbon dioxide from a gas mixture containing it in a high concentration, the process comprising supplying the gas mixture at superatmospheric pressure and substantially free of contaminants which would solidify under the process conditions, distilling said gas mixture at sub-ambient temperature in a distillation column and recovering substantially pure carbon dioxide as a liquid bottoms product of the distillation, warming the overhead stream from the distillation to a temperature suitable for membrane separation, passing the overhead stream at superatmospheric pressure over a membrane which is selectively permeable for carbon dioxide and thereafter recycling carbon dioxide-rich permeate for recompression and feeding to the distillation column.

By a temperature suitable for membrane separation, is meant a temperature at which the physical properties of the membrane are such that it is mechanically stable and a sufficient fluid flux can be maintained across the membrane. Thus the temperature should not be so low that the membrane would be embrittled and consequently unable to withstand the pressure differential across it, nor so high that the membrane would be softened and distort to an unacceptable extent. Suitably the overhead stream is warmed to a temperature in the range 0° to 50° C., preferably 0° to 30° C. and most preferably to around ambient temperature.

In a preferred embodiment, the overhead stream from the distillation column is warmed by indirect heat exchange with a refrigerant employed in closed cycle to provide cold for the column reflux. In such circumstances design features of the refrigeration cycle and an appropriate choice of refrigerant can advantageously lead to the overhead stream being warmed to ambient temperature.

The process of the invention enables the achievement of a high recovery of high purity carbon dioxide from gas streams containing carbon dioxide in high concentrations. For example a recovery of above about 90% and most preferably above about 95% carbon dioxide can be achieved. Under suitable conditions the recovery of carbon dioxide can be improved to 99% or more of the $CO_2$ in the feed gas. For gas streams containing lower concentrations of $CO_2$, e.g. below about 40%, separation is usually carried out for the purpose of removing the $CO_2$ as an undesirable impurity, rather than for recovering $CO_2$. Examples of gas streams containing carbon dioxide in high concentrations from which it may be desired to separate carbon dioxide are certain natural gases and gas effluents from petrochemical works and other gas sweetening operations. In such cases the associated constituents are mainly light hydrocarbons such as methane and ethane.

Any suitable membrane may be employed but it is preferred to use those wherein the carbon dioxide permeability is at least 10 times that of the gas or gases from which it is to be separated under the chosen separation conditions. Examples of suitable membranes are those formed from polysulphone or cellulose acetate.

Figure 3:
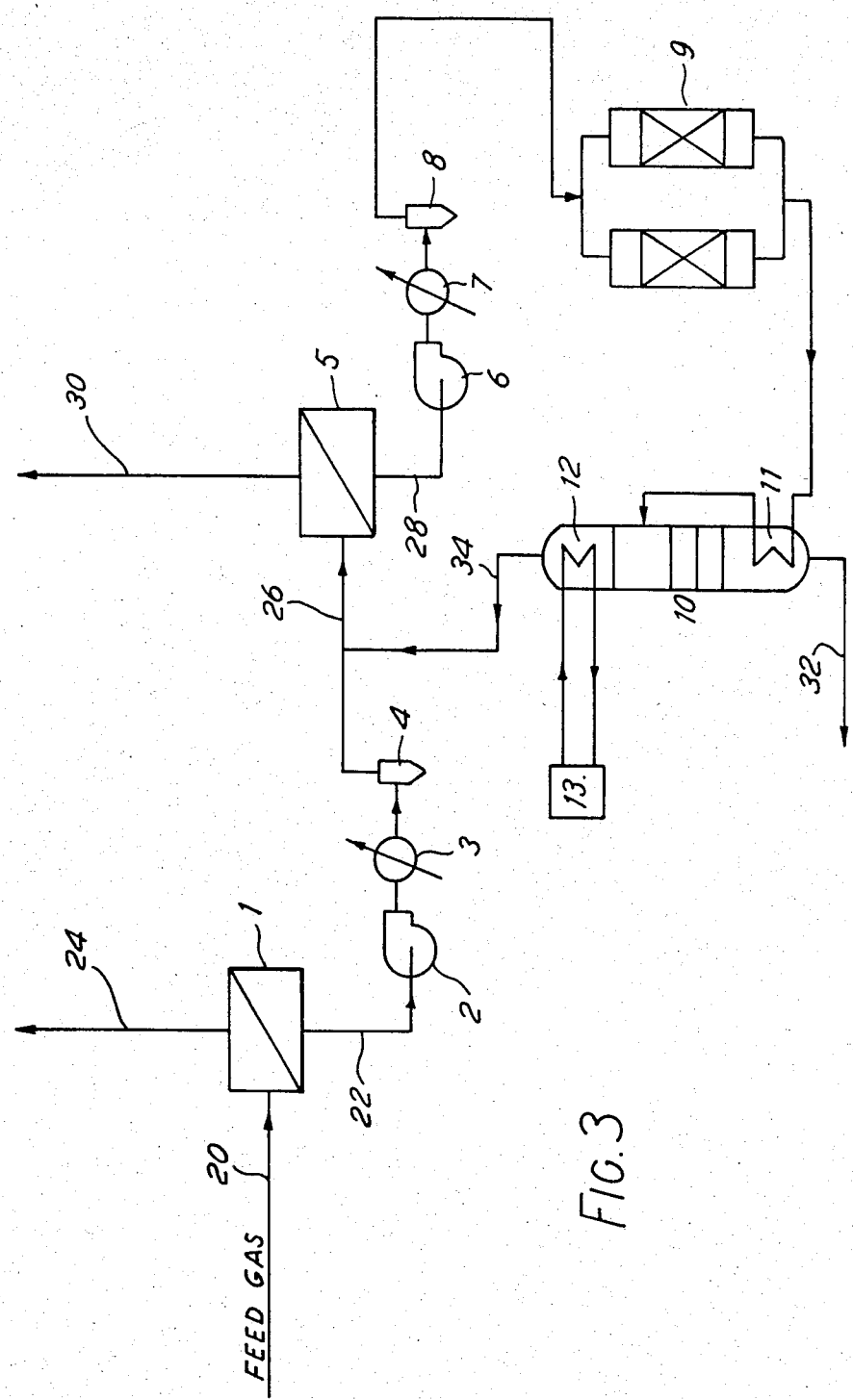
Figure 4:
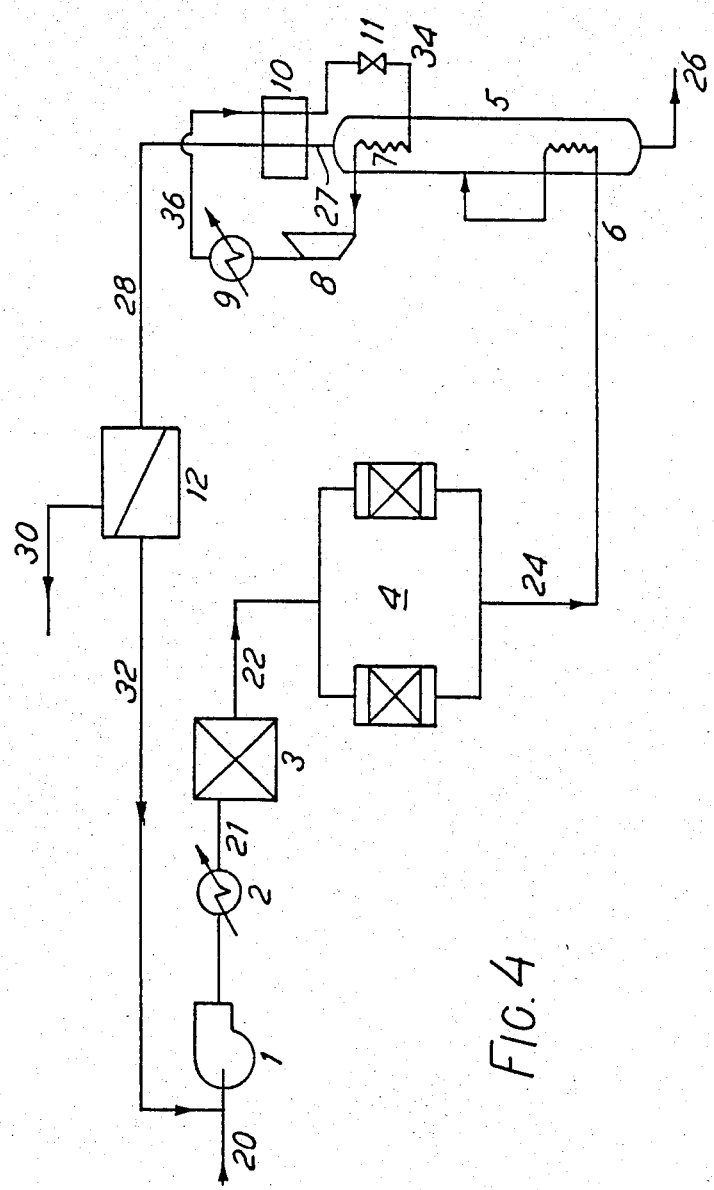

The invention is now described in more detail with reference to preferred embodiments and with the aid of the accompanying drawings in which FIG. 3 is a flow diagram of the process for recovery of carbon dioxide from a gas mixture containing it in a concentration not greater than the equilibrium concentration; and FIG. 4 is a flow diagram of the process for recovery of carbon dioxide from a gas mixture containing it at a high concentration.

Referring to FIGS. 3, 1 and 5 are membrane separation units, 2 and 6 are compressors, 3 and 7 are coolers, 4 and 8 are gas/liquid separators, 9 is an adsorber unit, 10 is a distillation column, 11 is a reboiler, 12 is a condenser and 13 is a refrigeration unit.

The carbon dioxide-containing feed gas mixture, at a suitably elevated pressure, is provided through pipeline 20 to membrane separation unit 1, where it is separated into a carbon dioxide-rich permeate which is recovered through line 22 and a tail gas which is lean in carbon dioxide and which is recovered through line 24. The gas in line 22 is recovered from membrane unit 1 at a pressure below the desired inlet pressure to membrane unit 5. It is first recompressed in compressor 2 and then cooled in cooler 3, any condensate thereby formed being separated in gas/liquid separator 4 and the resultant gas being supplied to membrane unit 5 through pipeline 26.

In membrane unit 5, further carbon dioxide-enrichment occurs with the carbon dioxide-rich stream being recovered through pipeline 28 and the lean gas stream being recovered through pipeline 30.

The gas in pipeline 28 is then supplied to distillation column 10. If the pressure at which it is recovered from the membrane separation unit 5 is below the desired distillation pressure, the gas is first recompressed in compressor 6, cooled in cooler 7 and any condensate so formed is separated in gas/liquid separator 8. Further drying can be carried out, if desired, by passing the gas through adsorber unit 9. The gas is then cooled to the desired distillation temperature by passage through distillation column reboiler 11 and then fed to an intermediate point in the distillation column. High purity carbon dioxide liquid, e.g. 99% or more pure, is recovered from the bottom of the column in pipeline 32 and the tail gas is recovered in pipeline 34 and returned to be combined with the feed gas in pipeline 26 to the second membrane unit 5. In the embodiment illustrated, the cooling for the condenser of the distillation column is provided by a vapour compression refrigeration unit 13 but other cooling means may also be used.

EXAMPLE 1

Using the process described above with reference to FIG. 3 of the drawings, the recovery of a substantially 100% carbon dioxide liquid stream from a gas stream comprising 88 mole% methane and 12 mole% carbon dioxide and supplied at a pressure of 28.6 bar and a temperature of 300° K. required an energy consumption of 1936 Kcals/Nm$^3$ of liquid carbon dioxide produced.

The details of temperature, pressure and composition of the gas streams in the various parts of the process are set out in Table 1 below.

TABLE 1

| Pipe-line | Flow (Nm$^3$/h) | Composition Mole % CH$_4$ | Mole % CO$_2$ | P (Bar) | T° K. |
|---|---|---|---|---|---|
| 20 | 100 000 | 88.0 | 12.0 | 28.6 | 300 |
| 24 | 82 226 | 97.0 | 3.0 | 28.0 | 310 |
| 22 | 17 774 | 46.4 | 53.6 | 1.5 | 303 |
| 26 | 19 530 | 46.4 | 53.6 | 27.5 | 303 |
| 28 | 10 158 | 8.0 | 92.0 | 1.5 | 300 |
| 32 | 8 402 | — | 100.0 | 28.0 | 266 |
| 34 | 1 756 | 46.4 | 53.6 | 27.5 | 240 |
| 30 | 9 372 | 88.0 | 12.0 | 27.0 | 303 |

The energy requirements expressed as Kcals/Nm$^3$ of liquid CO$_2$ produced, were as follows, assuming 30% efficiency for gas engine drives:

| | |
|---|---|
| Compressor 2: | 958 |
| Compressor 6: | 548 |
| Refrigeration Unit: | 410 |
| Carbon Dioxide Dryer 9: | 20 |
| Total | 1936 |

By way of comparison, the energy requirements for treating the same stream by the known solvent extraction process employing Sulfinol are 2401 Kcals/Nm$^3$ of liquid carbon dioxide produced and the energy requirements for treating the same stream by a conventional solvent extraction process employing a mixture of mono- and di-ethanolamine are 4379 Kcals/Nm$^3$ of liquid carbon dioxide produced.

Referring to FIG. 4, 41 is a compressor, 42 is an after cooler, 43 is a purification unit of conventional kind, 44 is a drier, 45 is a distillation column, 46 is a reboiler, 47 is a reflux condenser, 48 is a refrigerant compressor, 49 is a refrigerant condenser, 50 is a heat exchanger, and 51 is a refrigerant expansion valve, and 52 is a membrane separation unit.

The carbon dioxide-containing feed gas mixture is provided through pipeline 60 usually at a pressure in the range 0.7 to 2.0 bar, compressed in compressor 41 usually to a pressure in the range 10 to 30 bar, and then cooled in after cooler 42 to remove the heat of compression. The gas mixture is then supplied via line 61 to purification unit 43 where sulphur-containing impurities are removed by known means such as absorption or catalytic reaction. When such a sulphur removal step is carried out at high temperature in a catalyst bed, then this may precede the after-cooler 42. After purification the gas mixture is passed through line 62 to drier 44 which is of conventional form using beds of absorbent. The dried gas mixture is then supplied via line 64 to distillation reboiler 46 where it gives up heat to provide reboil for the distillation and is cooled to the desired distillation temperature usually −3° to −40° C. The thus-cooled feed is then fed to an intermediate point in the distillation column, which generally operates with a bottom temperature in the range −40° to −12° C. and an overhead temperature in the range −50° to −20° C. The distillation generally operates at a pressure which is slightly, e.g. 1 to 3 bar, below the pressure of gas leaving compressor 41, e.g. a pressure in the range 10 to 25 bar. High purity carbon dioxide e.g. 99% or more pure, is recovered from the bottom of the column in line 66 and the tail gas is recovered in line 67 warmed in heat exchanger 50, usually to a temperature of 0° to 50° C. and fed to membrane separation unit 52. There the tail gas is separated into a carbon dioxide-rich permeate which is recycled via line 72 to feed line 60 and a stream depleted in carbon dioxide which is recovered through line 70. Using this process a high recovery of high purity carbon dioxide can be obtained.

In the embodiment illustrated in FIG. 4 the cold for production of liquid CO$_2$ and for the distillation column reflux is provided by a closed regrigeration cycle for which in this case the refrigerant is ammonia. In the refrigeration cycle, warm liquid refrigerant from the condenser, 49 passes via line 76 to exchanger 50 where it is sub-cooled before expanding through valve 51 and passing via line 74 to reflux condenser 47, where it is evaporated by indirect heat exchange with the carbon dioxide containing gas mixture. The refrigerant is then compressed by refrigerant compressor 48, cooled and condensed in refrigerant condenser 49.

The tail gas from the distillation must be warmed before contact with the membrane separation unit.

It is suitably warmed to ambient temperature, that is to a temperature in the range 0° to 50° C., preferably 0° to 30° C., and most preferably ambient temperature, to avoid potential problems associated with mechanical instability of the membrane at low temperatures. It is convenient to do this by heat exchange with a condensed refrigerant as described above in which refrigerant condensation has conveniently been effected by heat exchange with air or cooling water provided at ambient temperature. Another possibility is to warm the tail gas by heat exchange with the carbon dioxide containing gas mixture before said mixture is fed to the reboiler 46. In either case the tail gas will preferably be warmed to about ambient temperature before contact with the membrane separation unit.

EXAMPLE 2

The details of temperature, pressure and composition of the gas streams in various parts of the process described above with reference to the drawing are set out in Tables 2 and 3 below. The carbon dioxide recovery in this case is 99.6%.

TABLE 2

| Line | Temp (°C.) | Pressure (bar) |
|---|---|---|
| 60 | +30 | 1.0 |
| 61 | +30 | 17 |
| 62 | +30 | 16.6 |
| 64 | +35 | 16.3 |
| 66 | −29 | 14.5 |
| 67 | −35 | 14.3 |
| 68 | +20 | 14.2 |
| 72 | +15 | 1.1 |
| 74 | −40 | 0.72 |
| 76 | +40 | 15.5 |

TABLE 3

| Component | Flows in kg mol/hr (dry basis) | | | |
|---|---|---|---|---|
| Line | $CH_4$ | $C_2H_6$ | $CO_2$ | Total |
| 60 | 0.12 | 1.73 | 152.53 | 154.38 |
| 64 | 0.13 | 1.82 | 157.53 | 159.48 |
| 66 | — | — | 151.94 | 151.94 |
| 68 | 0.13 | 1.82 | 5.59 | 7.54 |
| 70 | 0.12 | 1.73 | 0.59 | 2.44 |
| 72 | 0.01 | 0.09 | 5.00 | 5.10 |

What is claimed is:

1. A process for the recovery of carbon dioxide from a gas mixture containing carbon dioxide in a concentration not greater than the equilibrium concentration at the freezing temperature of the mixture, the process comprising subjecting the gas mixture to membrane separation;
   recovering from said membrane separation a permeate wherein the concentration of carbon dioxide is between said equilibrium concentration and 98% (by volume) of the permeate and thereafter
   subjecting said permeate to distillation at sub-ambient temperature above the freezing temperature of the permeate; and
   recovering substantially pure carbon dioxide as a liquid bottoms products of said distillation.

2. A process as claimed in claim 1 in which the carbon dioxide content of the permeate obtained by membrane separation is at least 85% by volume.

3. A process as claimed in claim 1 in which the carbon dioxide content of the permeate obtained by membrane separation is at least 90% by volume.

4. A process as claimed in claim 1 in which the membrane separation step involves the use of at least two membranes in series.

5. A process in accordance with claim 4 in which the gas recovered from one of said at least two membranes is repressurised prior to feeding to the next of said membranes.

6. A process as claimed in claim 1 in which the overhead stream from the distillation is recycled to the first or a subsequent membrane of the membrane separation step.

7. A process as claimed in claim 1 in which the gas mixture also contains nitrogen.

8. A process as claimed in claim 1 in which the gas mixture also contains at least one hydrocarbon.

9. A process as claimed in claim 8 in which the gas mixture also contains methane.

10. A process for the recovery of carbon dioxide from a gas mixture containing it in a high concentration, the process comprising supplying the gas mixture at superatmospheric pressure and substantially free of contaminants which would solidify under the process conditions, distilling said gas mixture at sub-ambient temperature in a distillation column and recovering substantially pure carbon dioxide as a liquid bottoms product of the distillation, warming the overhead stream from the distillation to a temperature suitable for membrane separation, passing the overhead stream at superatmospheric pressure over a membrane which is selectively permeable for carbon dioxide and thereafter recycling carbon dioxide-rich permeate for recompression and feeding to the distillation column.

11. A process as claimed in claim 10 in which the overhead stream from the distillation column is warmed to a temperature in the range 0° to 50° C. before being fed to said membrane.

12. A process as claimed in claim 10 in which the overhead stream from the distillation column is warmed to a temperature in the range 0° to 30° C. before being fed to said membrane.

13. A process as claimed in claim 10 in which the overhead stream from the distillation column is warmed before being fed to said membrane by indirect heat exchange with a refrigerant employed in closed cycle to provide cold for the column reflux.

14. A process as claimed in claim 10 in which the carbon dioxide is recovered from a gas mixture containing it in a concentration greater than 40%.

15. A process as claimed in claim 10 in which more than 90% by volume of the carbon dioxide in the gas mixture is recovered as a liquid bottoms product of the distillation.

16. A process as claimed in claim 10 in which more than 95% by volume of the carbon dioxide in the gas mixture is recovered as a liquid bottoms product of the distillation.

* * * * *